United States Patent [19]

West

[11] 4,236,618

[45] Dec. 2, 1980

[54] TORQUE TRANSMITTING AND BLOCKING DEVICE

[76] Inventor: Joe E. West, 11426 Goodnight La., Dallas, Tex. 75229

[21] Appl. No.: 841,809

[22] Filed: Oct. 13, 1977

[51] Int. Cl.$^2$ .......... F16D 67/00

[52] U.S. Cl. .......... 192/8 R; 192/26; 192/76; 188/134; 242/99

[58] Field of Search .......... 192/8 R, 26, 22, 75, 192/30, 76, 14; 188/134, 82.1, 82.3, 82.5; 242/99; 254/186 HC, 186 R, 169; 74/125.5

[56] References Cited

U.S. PATENT DOCUMENTS

| | | | |
|---|---|---|---|
| 863,345 | 8/1907 | Beebe et al. | 254/186 HC |
| 2,379,071 | 6/1945 | Faust et al. | 192/8 R |
| 2,718,286 | 9/1955 | Clark | 188/134 |
| 2,918,275 | 12/1959 | Arlauskas | 192/8 R |
| 3,000,626 | 9/1961 | Darney | 192/8 R |
| 3,994,476 | 11/1976 | van Gennep | 188/134 |

*Primary Examiner*—George H. Krizmanich
*Attorney, Agent, or Firm*—Thomas L. Cantrell; Joseph H. Schley

[57] ABSTRACT

Disclosed is a torque transmitting and blocking device which includes a cylindrical drum, a pair of arcuate shoes positioned within the drum, and a spanner bar extending between the shoes to one side of the axis of the drum. On the other side of the drum axis the shoes are displaceable toward each other, and may conveniently be lightly biased apart. The shoes have surfaces, which may include holes, lateral or transverse projections, or the ends of the shoes, through which rotative forces may be transmitted from sources external of the drum and through which the shoes may retransmit such forces. Application of a rotational force through such a surface into a shoe in a direction tending to displace the shoes toward each other results in rotation of the shoes and bar within the drum, and consequent transmission of torque, if desired, out of the drum through another shoe surface. Application of a rotational force into a shoe in a direction tending to displace the shoes away from each other throws the shoes into a jamming relationship with the wall of the drum and prevents transmission of torque past or through the device. Applications of the device in apparatuses for winches, stepping clutches, and automatic load holders are disclosed.

31 Claims, 24 Drawing Figures

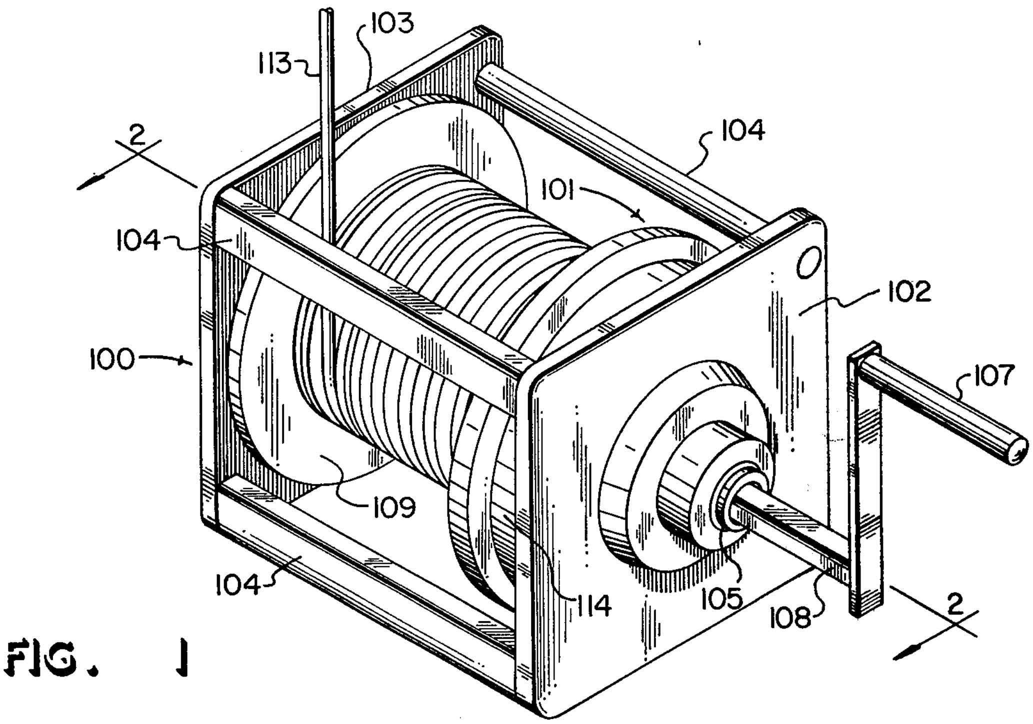
FIG. 1
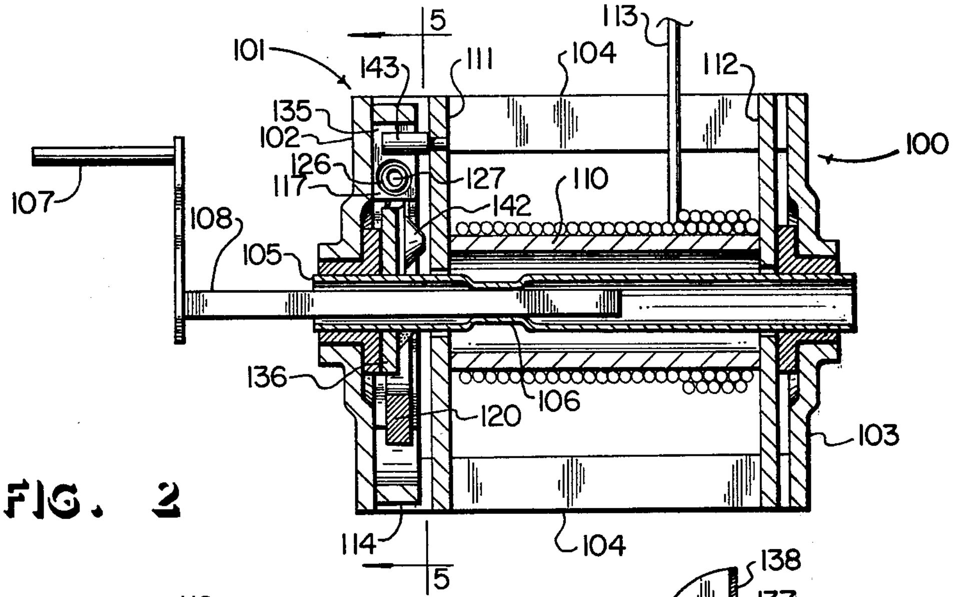
FIG. 2
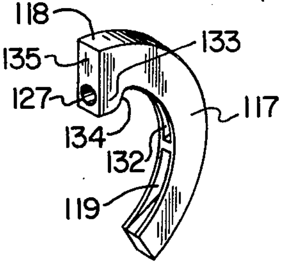
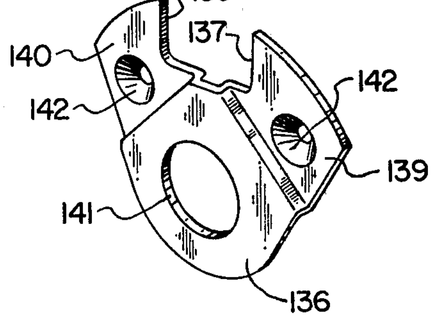
FIG. 3
FIG. 4

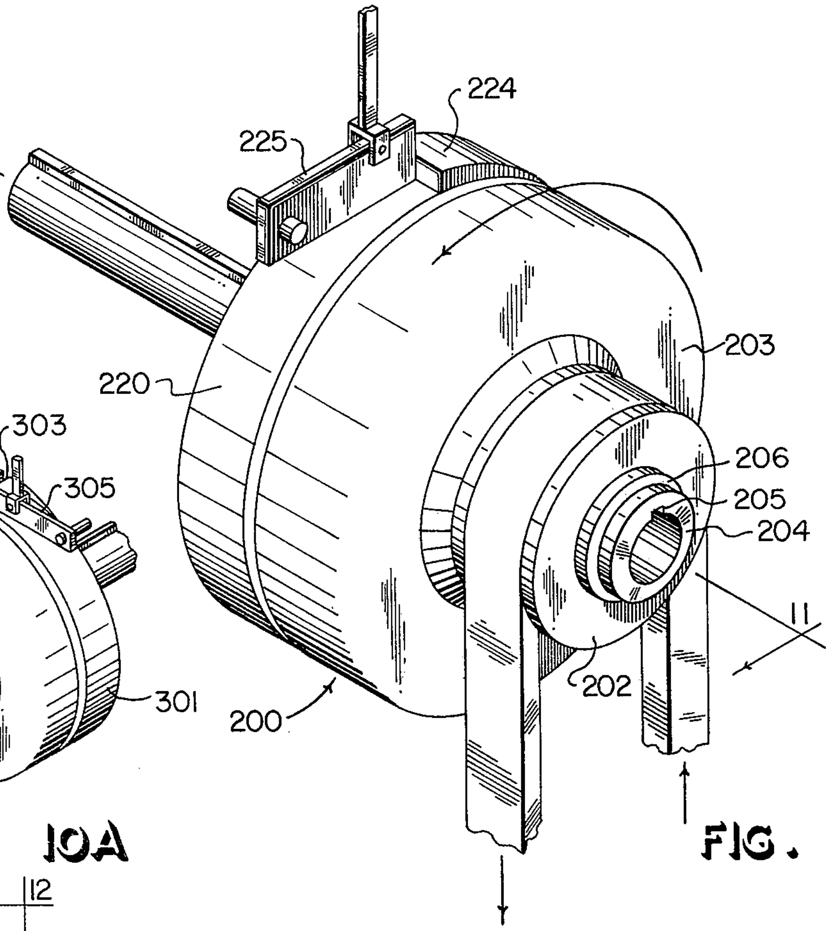
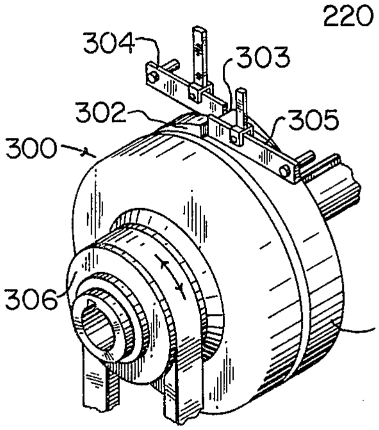
FIG. 10A
FIG. 10
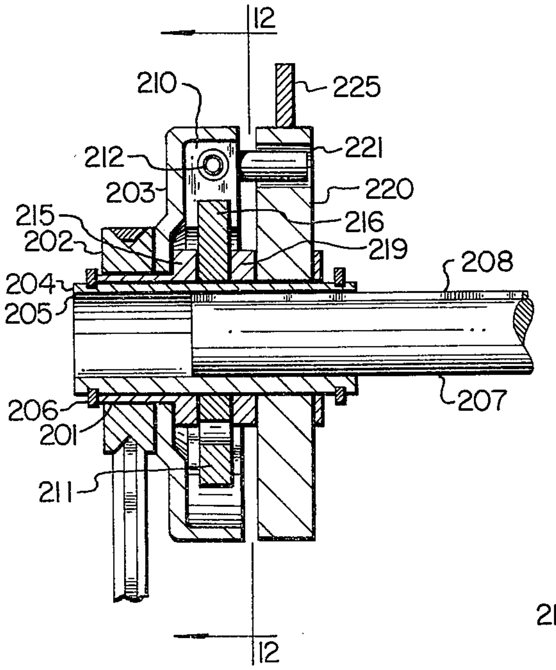
FIG. 11
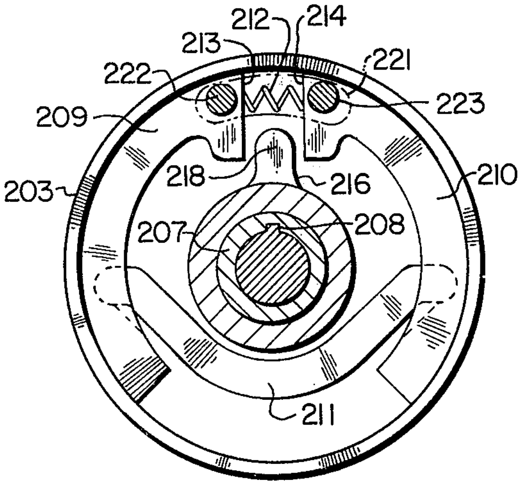
FIG. 12
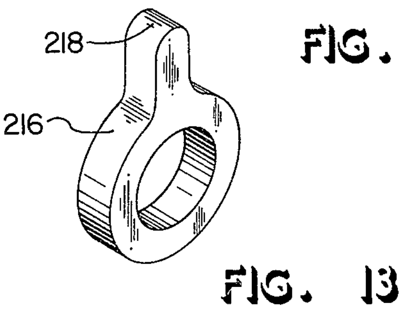
FIG. 13

TORQUE TRANSMITTING AND BLOCKING DEVICE

BACKGROUND OF THE INVENTION

There are many situations where it is desirable to control the transmission of torque through an apparatus, for example, to transmit it in one direction through a power train (from input to load), but block its transmission in the opposite direction (from load to input), in one or both directions of rotation. Apparatus for accomplishing such functions has in the past been complex in construction and limited in capabilities.

SUMMARY OF THE INVENTION

In accordance with the present invention, apparatus is provided for transmitting torque, and for controlling its transmission both with respect to direction through a power train and with respect to direction of rotation. The apparatus may be a link in the power train itself, or in some applications, a side branch of the train which serves only to block torque transmission in a selected direction, without transmitting torque in the other direction.

The apparatus of the invention is characterized by its simplicity, ruggedness in construction, and reliability in operation. In a given device, the geometry of the parts is fixed, and they respond to applied forces predictably without need for adjustment or tuning.

In its preferred embodiments, the invention comprises a drum having a generally cylindrical inner surface. Depending upon the application, the drum may be mounted for rotation in either or both directions about its axis, or it may be fixed against rotation. A pair of shoes having arcuate surfaces generally conforming to the inner surface of the drum are mounted for selective relative or absolute rotation therein by sliding around the inner surface of the drum. The ends of the respective shoes approach each other but do not meet.

A spanner bar holds the shoes apart on one side of the axis of the drum. The spanner bar bears against the inner surfaces of the shoes to hold them generally against the inner surface of the drum. At their ends lying across the drum axis from the spanner bar the shoes are displaceable toward each other. In many cases it will be desirable to lightly bias these ends of the shoes apart.

In accordance with the invention, the spanner bar is so positioned with respect to the drum axis that a perpendicular struck from its centerline at the intersection of the centerline with the inner drum surface will form an angle with a drum inner surface tangent struck from the same point which is in the lock angle range for the materials employed to form the drum and shoe surfaces. Such an angle is generally in the neighborhood of seven (7) degrees. Such an angle is sometimes referred to herein as a jamming angle.

Torques, and blocking torques, are transmitted into and out of the device through surfaces provided on the shoes, these surfaces being termed herein "force transmitting surfaces". The force transmitting surfaces of the shoes are oriented generally radially of the drum so that a force applied generally orthogonally therethrough produces a torque about the axis of the drum. The force transmitting surfaces may be variously formed, and may comprise holes in the shoes, lateral or transverse projections on the shoes, or the ends of the shoes.

Cooperating with the force transmitting surfaces are force transmitting means which are engageable with the surfaces under various conditions to produce or block the transmission of torque. These force transmitting means are mounted for rotation about the drum axis, and may be positioned entirely within the confines of the drum, or partly externally of the drum. The force transmitting means may take various forms such as yokes with opposed working faces, collars with radial fingers, disks with pins, slotted disks, etc.

In operation, torque is applied to a shoe of the device of the invention through a force transmitting means acting against a force transmitting surface of the shoe. If the force is applied in a direction such that it tends to displace the shoes toward each other at their ends which lie across the drum axis from the spanner bar, the shoes slidingly rotate with respect to the drum (assuming the input force is large enough to overcome internal and external forces opposing it). In many applications the drum will be fixed, so the rotation of the shoes is absolute, but in other applications the drum will be rotating, so the shoe rotation will be relative, with respect to the drum.

In devices of the invention which form a direct link in a power train, as distinguished from a side branch, the shoes which are rotating in the manner just described have another force transmitting surface suitably located thereon which engages another force transmitting means mounted for rotation about the drum axis, thereby applying an output torque to it and causing it to rotate, (again assuming the input forces are large enough to overcome internal and external forces opposing them). Torque consuming apparatus of many sorts may be connected to the second mentioned torque transmitting means.

With the device operating in the manner just described, if torque input is discontinued, the torque consuming apparatus (the "load") will, in many cases, tend to apply an undesired back torque, either in the original direction of rotation, or in the opposite direction. This back torque, and/or the movement resulting therefrom is often undesirable in its effect on the load or the input power source, or both. In accordance with the invention, the second-mentioned force transmitting means applies a force through a force transmitting surface of a shoe in a direction tending to displace the shoes away from each other at their ends which lie across the drum axis from the spanner bar. As a result, the shoes are thrown into a jamming relationship with the inner wall of the drum, because of the above-mentioned jamming angle. Rotation (relative or absolute) of the shoes with respect to drum thus becomes impossible, and ceases. Transmission of torque is blocked by the jammed shoes.

The fundamental apparatus as just described may be incorporated in many types of equipment performing a wide variety of functions. In the detailed description which follows, it is disclosed as embodied in a cable winch, a undirectional stepping clutch, a bi-directional stepping clutch, a one-way load holder, and a two-way load holder. These examples are intended to illustrate the wide applicability of the invention.

From the foregoing, it can be seen that a principal object of this invention is to provide a torque transmitting device which is simple and rugged in construction, reliable in operation, and versatile in operation.

It is another object of the invention to provide a torque transmitting device in which torque throughout may be in either direction of rotation and blocking of back torque is effective in both directions of rotation.

A further object of the invention is the provision of a torque transmitting stepping clutch operable in either direction of rotation.

Still another object of the invention is the provision of a torque transmission device which is an effective load-holder upon discontinuance of power input.

The manner in which the foregoing objects and purposes are attained, together with other objects and purposes, may be best understood from a consideration of the detailed description which follows, together with the accompanying drawings.

DESCRIPTION OF THE DRAWINGS

FIG. 1 is an isometric view of a cable winch embodying the torque transmission and blocking device of the invention;

FIG. 2 is a longitudinal cross-sectional view of the winch of FIG. 1, the section being taken on the line 2—2 of FIG. 1;

FIG. 3 is an isometric view of a shoe constructed in accordance with the invention, as used in the embodiment of FIG. 1, as well as in other embodiments;

FIG. 4 is an isometric view of a force transmitting means or yoke constructed in accordance with the invention, as used in the embodiment of FIG. 1, as well as in other embodiments;

FIG. 10 is an isometric view of a unidirectional stepping clutch embodying the torque transmission and blocking device of the invention;

FIG. 10A is an isometric view of a bi-directional stepping clutch embodying the torque transmission and blocking device of the invention;

FIG. 11 is a longitudinal cross-sectional view of the clutch of FIG. 10, the section being taken on the line 11—11 of FIG. 10;

FIG. 12 is a transverse sectional elevational view of the clutch of FIG. 10, the section being taken on the line 12—12 of FIG. 11;

FIG. 13 is an isometric view of a force transmitting means or collar with projecting finger constructed in accordance with the invention, as used in the embodiment of FIGS. 10 and 10A;

DESCRIPTION OF THE PREFERRED EMBODIMENTS

Figure 5:
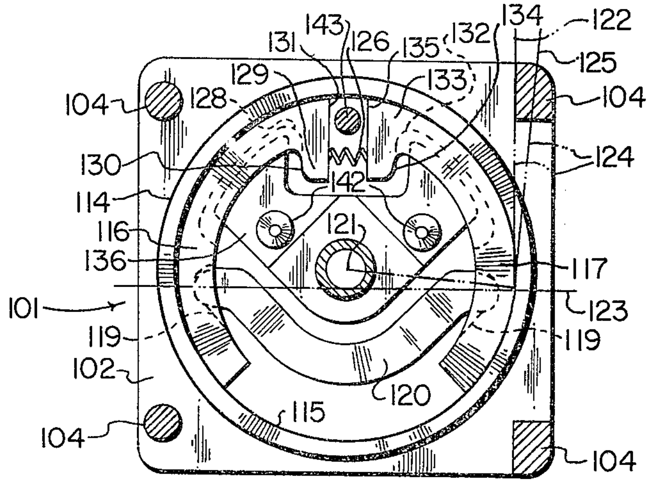
FIG. 5 is a tranverse sectional elevational view of the winch of FIG. 1, the section being taken on the line 5—5 of FIG. 2.

A. The Invention as Embodied in a Winch:

FIGS. 1–9 illustrate the torque transmitting and blocking device of the invention embodied in a cable winch, such as may be employed in a flagpole winch. In these FIGS. the winch is designated generally as 100, while the torque transmission and blocking device is designated generally as 101.

Winch 100 has a frame formed of front plate 102 and rear plate 103, held in spaced parallel relation by spacer bars 104. A hollow drive shaft 105 is journalled for rotation in the center of plates 102, 103. Part of shaft 105 is swaged down to square section, as at 106, for engagement with a removable crank 107 having a shank 108 of square cross section.

A cable drum 109, formed of barrel 110 and end flanges or disks 111, 112, is mounted for rotation on drive shaft 105. Cable 113 is wound on the barrel, and leads to the load. Cable drum 109 is interconnected for rotation to drive shaft 105 through the torque transmission and blocking device 101, as is explained below.

The torque transmission and blocking device 101 includes generally cylindrical drum 114, which is mounted on the back of front plate 102, and is coaxial with drive shaft 105 and barrel 110. Drum 114 has a generally cylindrical inner wall 115.

Figure 6:
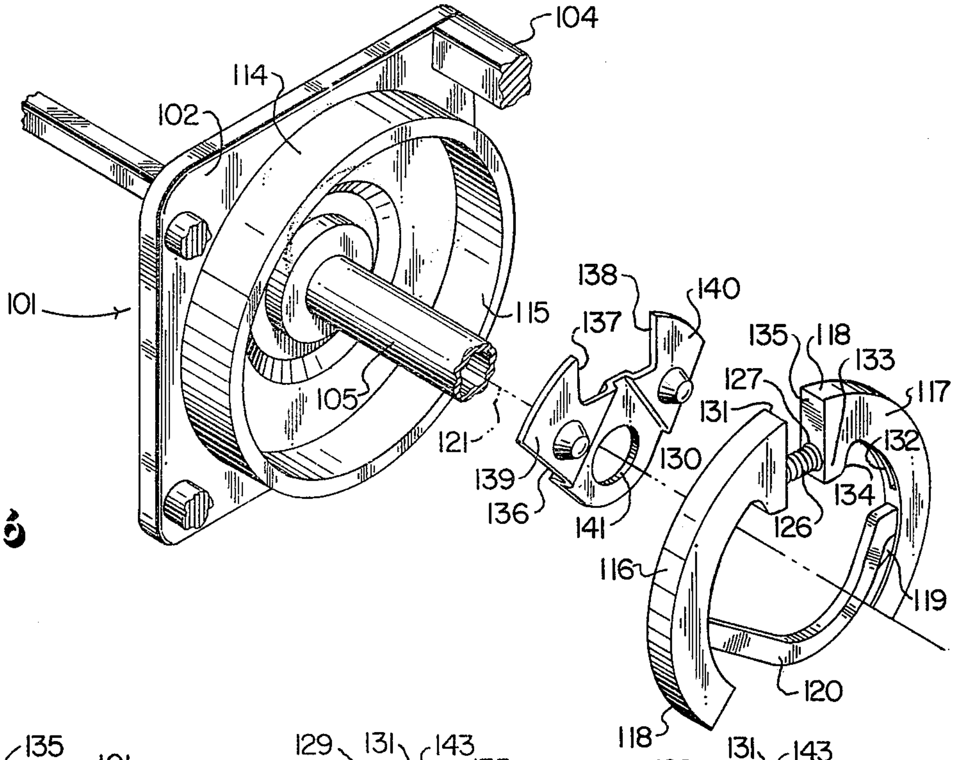
FIG. 6 is a fragmentary exploded isometric view of the major torque transmitting and blocking parts of the winch of FIG. 1.

The parts of the torque transmission and blocking device which are positioned within drum 115 can best be understood from a consideration of FIGS. 2–6, and particularly FIGS. 5 and 6.

A pair of shoes 116, 117 are positioned within drum 114. The shoes have arcuate outer surfaces 118 generally conforming to the curvature of wall 115. It is preferred that the two shoes subtend equal arcs and that the arc subtended by each shoe be a substantial portion of a semicircle.

Each shoe is provided with a recess 119 on its inner or convex surface for receiving and engaging an end of spanner bar 120. Spanner bar 120 engages the shoes at points lying on the same side of the axis 121 of drum 114, as can best be seen from FIG. 5. Spanner bar 120 is offset somewhat from axis 121 to form a good jamming angle. This is illustrated in FIG. 5 where it can be seen that a tangent 125 struck from the inner wall 115 of the drum at the point where the wall is intercepted by the end-to-end centerline 123 of the spanner bar forms an angle 124 with a line 122 drawn perpendicular to the centerline 123 at the same point on the wall, which angle is about 7 degrees.

At their ends on the opposite side of the drum axis from their points of engagement with the spanner bar, shoes 116 and 117 are displaceable toward each other. It is preferred, but not necessary, that they be lightly biased apart, as by spring 126, which fits into recesses 127 provided in the end faces of the shoes.

Certain surfaces of shoes 116, 117 are termed herein "force transmitting surfaces" because of their function in the operation of the device. As will become apparent as this and other embodiments of the invention are discussed, these surfaces may be variously formed and positioned on the shoes. Despite such variations, the force transmitting surfaces share the characteristic that they are at least in part generally radially oriented with respect to the drum. This means that forces applied generally orthogonally through them (either into the shoe or out of the shoe) result in the generation of a torque about the axis of the drum.

In the embodiment of FIGS. 1-6, each shoe has two force transmitting surfaces. Shoe 116 has a recess 128 formed in its convex wall, and a radially inwardly extending leg 129 formed adjacent the recess. These two constructions taken together provide shoe 116 with its first force transmitting surface 130.

The second force transmitting surface of shoe 116 is its end face 131.

Similarly, shoe 117 is provided with a recess 132 and leg 133 to form its first force transmitting surface 134. (See FIG. 3). The second force transmitting surface of the shoe 117 is its end face 135.

The device of FIGS. 1-6 is equipped with two force transmitting means, one of which cooperates with the input or drive shaft 105, and the other of which cooperates with the cable drum 109 which is the output mechanism of the winch. The input force transmitting means is yoke 136, which is secured on drive shaft 105 for rotation therewith. Yoke 136 has opposed faces 137 and 138, which cooperate with force transmitting surfaces 130 and 134 of shoes 116 and 117 respectively. As can best be seen in FIG. 5, opposed faces 137, 138 are located on legs 139, 140 of the yoke, which legs fit into recesses 128, 132 of shoes 116, 117 respectively. Yoke 136 is apertured at 141 to fit on drive shaft 105. In the preferred embodiment yoke 136 is formed of sheet metal. Bosses 142 aid in maintaining it properly positioned.

The output force transmitting means comprises pin 143 which projects laterally from cable drum disk 111 into the space between force transmitting surface 131 of shoe 116 and force transmitting surface 135 of shoe 117. Pin 143 is thus in a position to bear against, or to be borne against by, force transmitting surfaces of both shoes.

With the foregoing description of the components of the torque transmitting and blocking device of the invention as embodied in a winch in hand, its mode of operation can be explained with reference to the diagrams of FIGS. 7-9.

Figure 7:
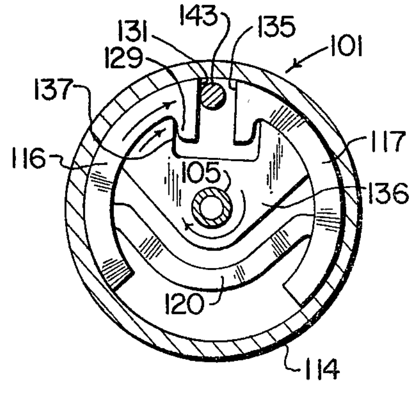
FIGS. 7, 8 and 9 are sequential diagrammatic sectional elevational views of the torque transmitting apparatus of the winch of FIG. 1, on a somewhat reduced scale, showing stages in the operation of the device.
Figure 8:
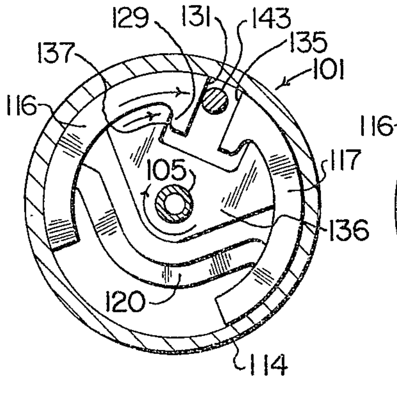

FIGS. 7 and 8 show how the device operates to transmit torque, and thus motion, from input shaft 105 to the output cable drum which carries pin 143. As shaft 105 is rotated clockwise (as is indicated by the arrow around the shaft), it rotates yoke 136 in the same direction. The face 137 of the yoke pushes against surface 129 of shoe 116 to rotate it clockwise also. The force exerted by yoke 136 on shoe 116 is in a direction tending to displace face 131 toward face 135, although such displacement does not occur because shoe 117 and spanner bar 120 rotate along with shoe 116.

As shoe 116 is driven clockwise by yoke 136, its surface 131 pushes against pin 143 to rotate it and the cable drum on which it is carried. Torque, and rotary motion, are thus transmitted from input shaft to output drum.

A consideration of the symmetry of the parts shown in FIGS. 7 and 8 will lead to the conclusion that the device will operate in the same manner if torque is input to drive shaft 105 to rotate it in a counterclockwise direction. Thus by turning crank 107 (FIG. 1) in one direction cable can be wound onto the cable drum, and by turning the crank in the other direction cable can be played off the drum in a controlled manner.

Figure 9:
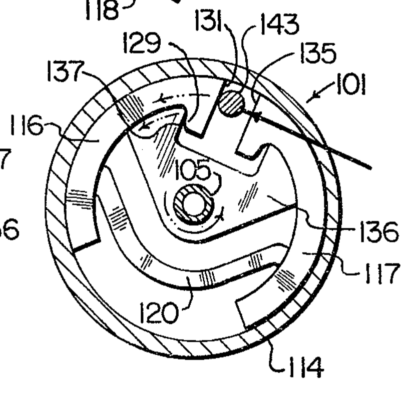
Figure 14:
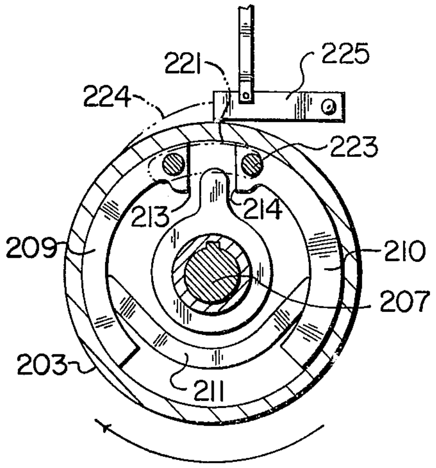
FIGS. 14, 15, 16 and 17 are diagrammatic sequential sectional elevational views of the clutch of FIG. 10, on a somewhat reduced scale, showing successive stages in a stepping operation.

FIG. 9 shows the torque-blocking condition of the device which occurs when an attempt is made, by application of force through the cable, or directly upon the cable drum, to rotate the cable drum other than by means of the crank. When a force (represented by the heavy straight arrow in FIG. 9) is applied to pin 143 in an attempt to rotate it counterclockwise, the pin pushes against surface 131 of shoe 116, that is, in a direction tending to displace surfaces 131 and 135 away from each other. This throws shoes 116 and 117 into a jamming relationship with the wall of drum 114, and prevents the transmission of torque to shaft 105. The counterclockwise movement thus attempted, and indicated by the phantom arrows in FIG. 9 cannot, and does not, take place.

Again, a consideration of the symmetry of the parts shown in FIG. 9 will lead to the conclusion that the device will operate in the same manner if force is applied through pin 143 in an attempt to rotate the cable drum in a clockwise position. The cable drum is effectively frozen by the device against all movement except that caused by forces applied through shaft 105.

B. The Invention as Embodied in a Unidirectional Stepping Clutch

FIG. 10, and FIGS. 11-18 illustrate the torque transmission and torque blocking device of the invention as embodied in a unidirectional stepping clutch, that is, a clutch in which rotational motion in one direction of rotation is continuously supplied at the input, and a single revolution (or group of revolutions or even a fraction of a revolution) is obtained at chosen times at the output.

Attention is first directed to FIGS. 10, 11-13 and 18. In these FIGS. the clutch is designated generally as 200. It has a hollow input shaft or bushing 201 on which belt driven sheave 202 is mounted. Rotation of the sheave thus results in rotation of shaft 201. Also mounted for rotation on and with shaft 201 is clutch drum 203.

The output shaft of clutch 200 is formed in two pieces for convenience. One piece is a hollow shaft 204, having an internal keyway 205. Shaft 204 passes through hollow input shaft 201, and the fit between the two admits of relative rotation between them. A keeper ring 206 fixes the axial relationships of shafts 201 and 204. The other piece of the output shaft is solid shaft 207 which has an external spline 208 thereon. Shaft 207 fits into hollow shaft 204, with spline 208 interfitting in keyway 205 so that the two shafts are united for rotation. Shaft 207 is normally a part or component of the equipment driven by the stepping clutch.

Within clutch drum 203 are positioned shoes 209 and 210, which are engaged by spanner bar 211. Spanner bar 211 is positioned on one side of the drum axis to form a jamming angle in the manner described above. Shoes 209, 210 are lightly biased apart by spring 212 working against shoe faces 213, 214.

It should be noted that input shaft 201 has a flanged end 215 (FIG. 11) which serves as a spacer for force transmission means 216. Transmission means 216 is in the form of a collar fixed on output shaft piece 204 for rotation therewith, with a radially projecting finger 218 thereon. As can be seen in FIG. 12, finger 218 projects into the space between faces 213 and 214 of shoes 209, 210, and is in position to act on, and be acted upon by them.

A spacer 219 separates force transmission mean 218 from control disk 220, which is journaled on output shaft piece 204, and is free to rotate with respect thereto. Control disk 220 comprises a force transmission means for the device. It is provided with a slot 221 into which projects pin 222 on shoe 209 and pin 223 on shoe 210. Pins 222 and 223 constitute force transmission surfaces of shoes 209, 210.

Control disk 220 has a stop 224 on its periphery which cooperates with liftable dog 225 to prevent rotation of the disk except when such rotation is desired.

Figure 15:
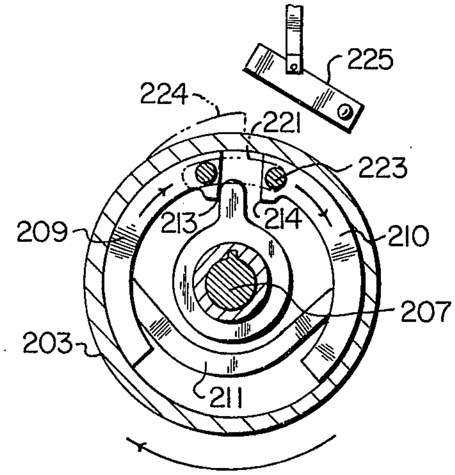
Figure 16:
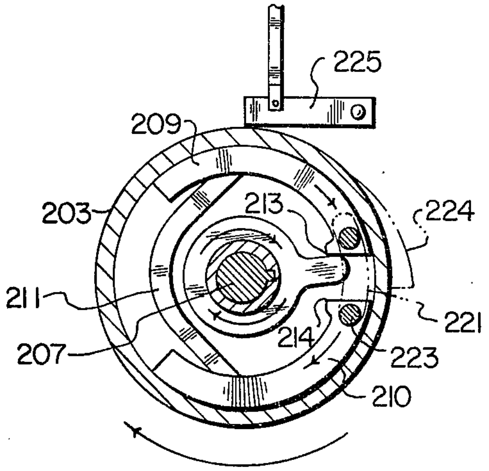
Figure 17:
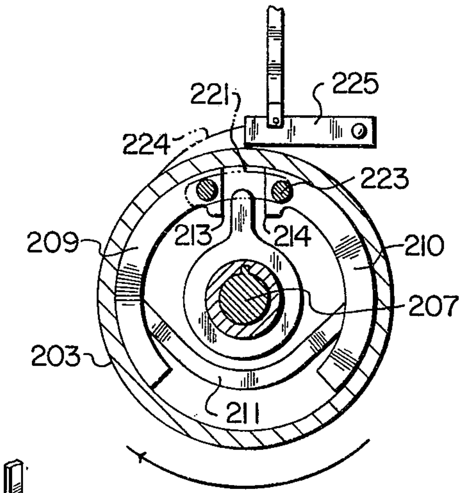
Figure 18:
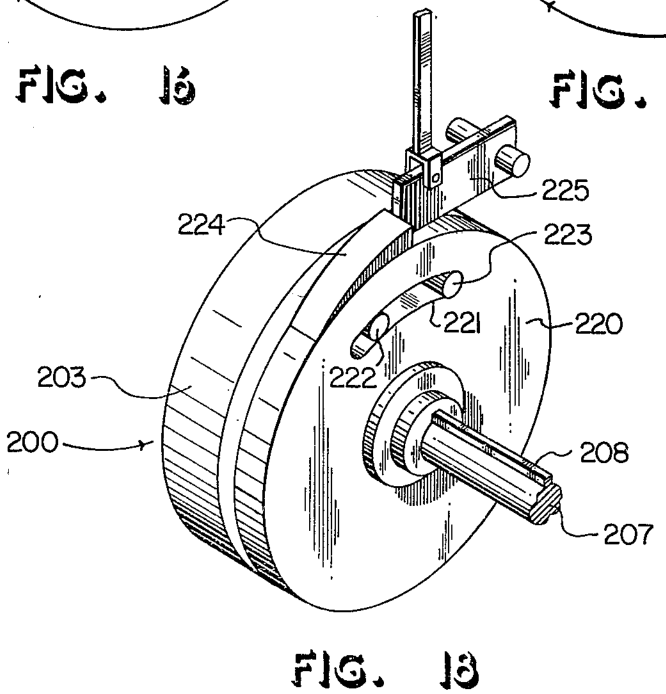
FIG. 18 is a fragmentary isometric view showing the backside of the clutch of FIG. 10.

The operation of stepping clutch 200 may be understood from a consideration of FIGS. 14–17. In FIG. 17, the unit is shown with torque being continuously input through shaft 201 (not visible as FIG. 17 is drawn), which causes drum 203 to continuously rotate. Disk 220, which is in front of the plane of the drawing in FIGS. 14–17, is indicated in FIG. 17 as restrained against rotation by dog 225 working against stop 224.

Under these conditions disk 220 exerts a virtual force by means of slot 221 against pin 223 in a direction tending to displace shoe end faces 213, 214 toward each other. This force holds shoes 209 and 210 out of jamming relationship with drum 203, and at a standstill. The standstill condition of the shoes is in fact relative rotation with respect to the drum, since the drum is rotating.

The start of an output shaft revolution is shown in FIG. 15, where dog 225 is shown as lifted, freeing disk 220 to rotate. Shoes 209, 210 will start to decelerate with respect to the drum, i.e., start to move with it because of friction between the drum and shoes, upon the removal of the above described force exerted by the disk 220 on pin 223. This will quickly bring shoe face 213 into contact with finger 218, and throw the shoes into jamming relationship with the rotating drum.

In FIG. 16, the jammed shoes are shown pushing finger 218 clockwise, which imparts clockwise rotation to output shaft 207. The jammed shoes also rotate disk 220 clockwise, because pin 223 pushes on the edge of slot 221. Such rotation continues until dog 225 engages stop 224 to halt the rotation of disk 220, as is shown in FIG. 17. The halted disk again applies a virtual force through pin 223 to unjam the shoes. This removes the torque applied to the output shaft through finger 218, and rotation of the output shaft ceases until dog 225 is again lifted.

If more than one output shaft rotation is desired, dog 225 may be held in lifted position to allow more than one shaft revolution. On the other hand, if fractional revolutions of the output shaft are desired, the number of stops on the periphery of disk 220 may be increased or a plurality of dogs may be placed around disk 220.

If power input through sheave 202 is discontinued, and an attempt is made to rotate output shaft 207, it will be found that shaft 207 is restrained from such rotation because finger 218 throws the shoes into jamming relationship with the now stopped drum 203.

C. The Invention as Embodied in a Bi-directional Stepping Clutch.

FIG. 10A illustrates a bi-directional stepping clutch 300 constructed in accordance with the invention. In structure it is the same as unidirectional clutch 200 of FIGS. 10 and 11–18, except that disk 301 is provided with two oppositely facing stops 302, 303, and each stop is provided with an appropriately oriented dog 304, 305. The belt of sheave 306 is powered to drive in either direction.

A consideration of the symmetry of the parts of the clutch, as explained in connection with FIGS. 10 and 11–18, will reveal that the mode of operation illustrated in FIGS. 14–17 will be the same if the rotation is in the counterclockwise direction instead of the clockwise direction.

D. The Invention as Embodied in a One-Way Load-Holder

Figure 19:
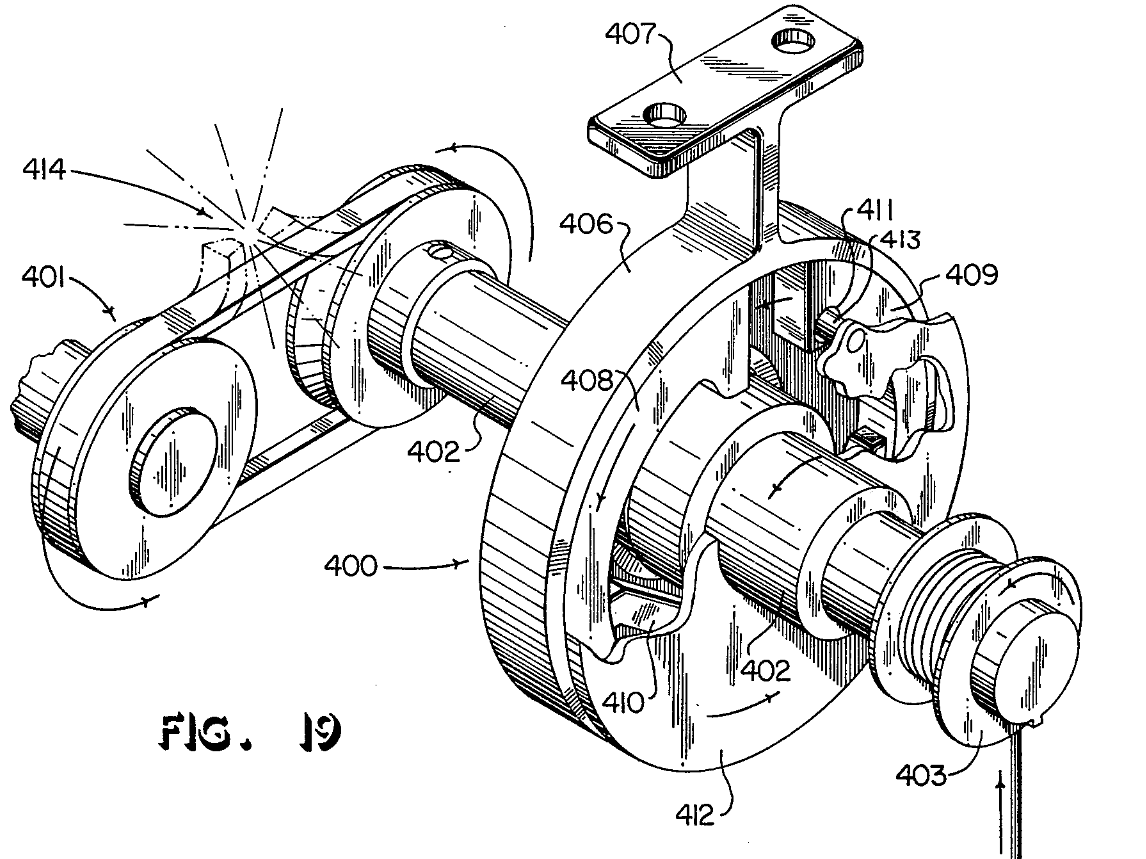
FIG. 19 is an isometric view, partly broken away, of a one-way load holder embodying the torque transmitting and blocking device of the invention.
Figure 19:
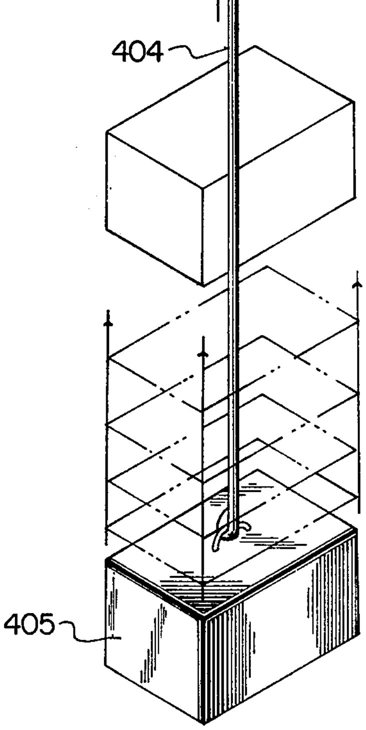
Figure 20:
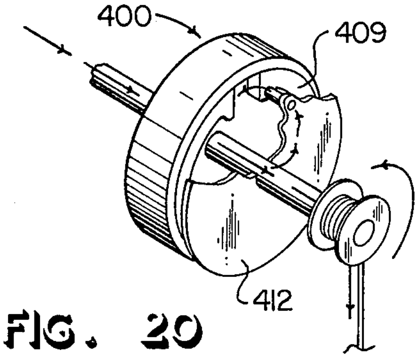
FIGS. 20 and 21 are sequential diagrammatic isometric views of the load holder of FIG. 20, on a somewhat reduced scale, showing successive stages in its operation.
Figure 21:
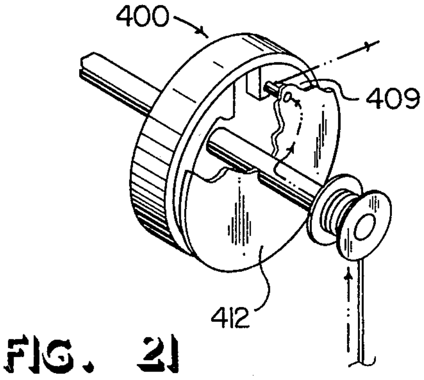

FIGS. 19–21 illustrate the invention as embodied in a one-way load-holder, that is, an apparatus which permits the transmission of torque in one direction of rotation from a power source to a load, but blocks the transmission of torque from the load back toward the power source in the other direction of rotation. The embodiment of FIGS. 19–21 differs from all of the other embodiments disclosed herein in that the jamming shoes of the invention are not a direct link in the power train between the power source and the load, but are rather in a "side branch" of the power train and are drawn into jamming operation only upon the occurrence back torque such as would often occur upon a failure or stoppage at the power source.

In FIG. 19, the load holder is designated generally as 400. It is associated with a power train which includes a belt drive 401; drive shaft 402; cable drum 403, mounted on the shaft; and cable 404, connected to load 405. This power train is illustrative of a wide variety of possible power train arrangements to which the load holder 400 can be applied.

The load holder 400 includes a generally cylindrical drum 406 mounted coaxially of shaft 402 by integral bracket 407. Within the drum are positioned two arcuate shoes 408, 409, configured much like those shown and described in connection with earlier embodiments. The shoes are engaged by a spanner bar 410, positioned to one side of the drum axis to form a jamming angle.

Shoe 409 has a hole 411 formed therein. As FIG. 9 is drawn, the left side of hole 411 constitutes a first force transmitting surface through which an externally applied force in the counterclockwise direction will tend to displace the ends of the shoes remote from the spanner bar toward each other. The right hand side of hole 411, as FIG. 19 is drawn, constitutes a second force transmitting surface through which an externally applied force in the clockwise direction will tend to displace the ends of the shoes remote from the spanner bar away from each other.

A disk 412 is mounted on shaft 402 for rotation therewith adjacent drum 406. Pin 413 is mounted on disk 412 and extends into hole 411 of shoe 409. In the terms in which the invention has been discussed herein, pin 413 and disk 412 constitute a force transmitting means cooperating with the force transmitting surfaces formed by the left and right sides of hole 411.

The operation of load holder 400 is as follows: As power is supplied to shaft 402 by belt drive 401, the shaft turns counterclockwise to rotate cable drum 403, thus winding up the cable and lifting load 405. The disk 412 rotates counterclockwise with shaft 402, and the pin 413 pushes on the left hand side of hole 411 to rotate the shoes and spanner bar within the drum. The force applied by pin 413 to shoe 409 is in a direction such that it does not jam the shoes.

The situation just described is illustrated in FIG. 19, where the various arrows indicate the direction of movement of the parts. This situation is also illustrated in the diagrammatic view of FIG. 20, where a series of small arrows diagrammatically indicate application of force through the shaft 402 both to the load (through the cable) and to shoe 409 (through disk 412).

The arrows illustrate the comment made above that the load holder is not a direct link in the power train, but is rather a side branch thereof.

In FIG. 19, a power failure is illustrated symbolically by the belt break shown in phantom lines at 414. Other types of power stoppages may occur, but the operation of load holder 400 is the same regardless of the kind of power stoppage. When application of power to the power train ceases, the dominant force on the system is the load 405, which tends to unwind cable off the cable drum and rotate shaft 402 clockwise. Attempted rotation of shaft 402 clockwise causes pin 413 to push on shoe 409 in a direction which throws the shoes into a jamming relationship with the inner wall of drum 406. This situation is illustrated in FIG. 19, where the series of small arrows indicate application of force by the load to shoe 409 through the cable, shaft, disk, and pin.

E. The Invention as Embodied in a Two-Way Load-holder

Figure 22:
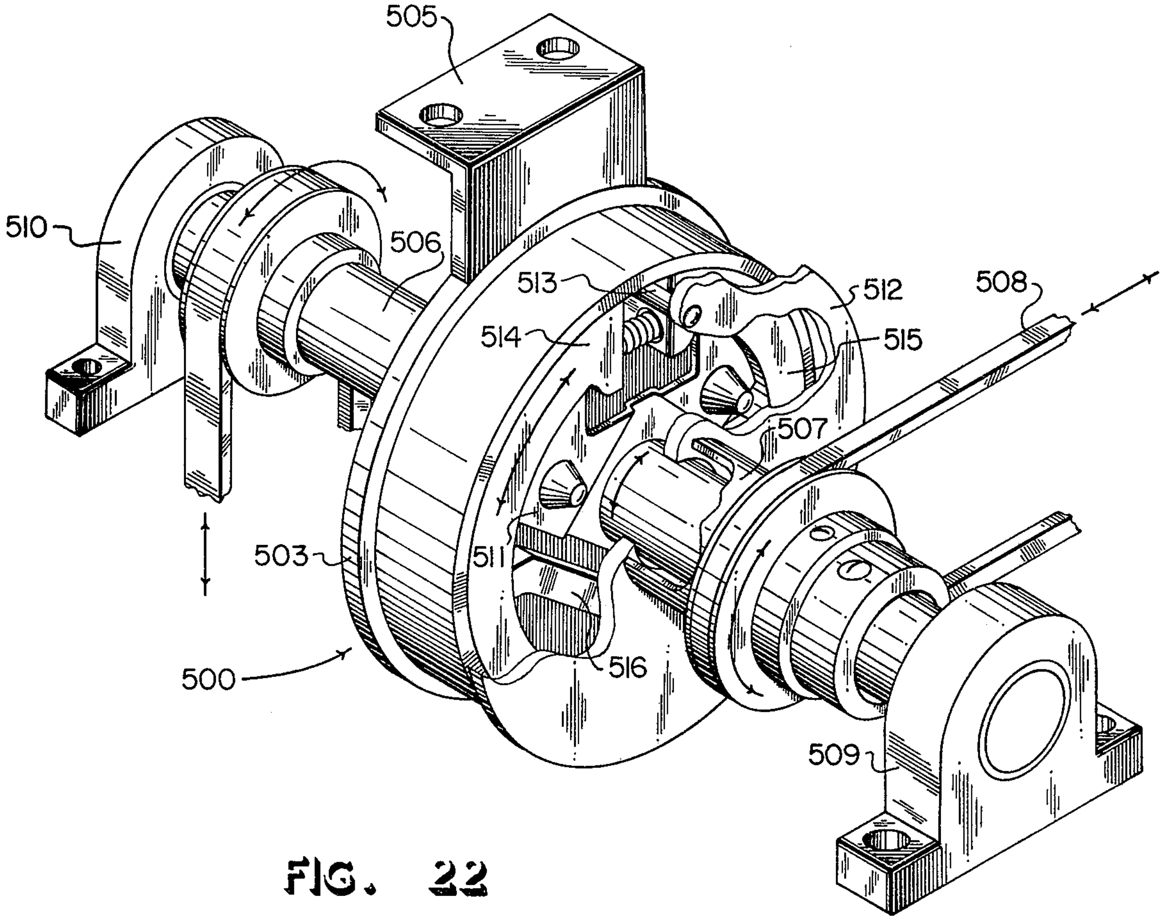
FIG. 22 is an isometric view, partly broken away, of a two-way load holder embodying the torque transmitting and blocking device of the invention.
Figure 23:
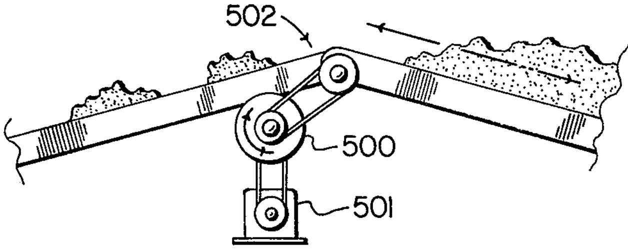
FIGS. 23 and 24 are somewhat diagrammatic elevational views, on a reduced scale of the load holder of FIG. 22 as applied in a conveyor system, illustrating different operating conditions to which the load holder may be exposed.
Figure 24:
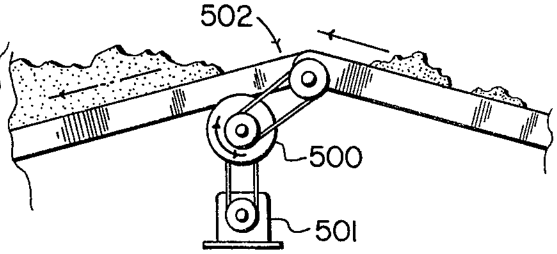

FIGS. 22-24 illustrate the application of the invention to a two-way load-holder useful in power trains in which torque may be applied to the load in either direction of rotation, and in which the load is liable to apply a back torque to the power train in either direction.

Such a situation is shown very diagrammatically in FIGS. 23 and 24. There, load-holder 500 forms part of a power train between power source 501 and conveyor system 502. The conveyor system is one which has a crest or high point in it, and as FIGS. 23 and 24 are drawn, is transporting bulk material from right to left. In FIG. 23, the heavier load is to the right of the power source. If a power failure occurs while this situation obtains, the conveyor will run away to the right, i.e. in the backward direction, in the absence of means for holding it in stopped position.

In FIG. 24, the heavier load is to the left of the power source. If a power failure occurs while this situation obtains, the conveyor will run away to the left, i.e. in the forward direction, in the absence of means for holding it in stopped position.

FIG. 22 illustrates the structure of load-holder 500. It comprises drum 503, mounted by bracket 505 so it will not rotate; belt driven input shaft 506; output shaft 507, driving belt 508; and pillow blocks 509, 510. The parts mounted internally of drum 503 are the same in structure and arrangement as those in the winch embodiment of FIG. 1, and they operate in the same way. Thus, they include yoke 511, mounted on input shaft 506; disk 512 carrying pin 513, shoes 514 and 515; and spanner bar 516.

In operation, load holder will transmit torques in either direction of rotation from the input shaft to the output shaft, but will block transmission of back torques in either direction applied by the output shaft, and thus effectively hold the load against movement in the event of a failure in the power train.

What is claimed is:

1. Apparatus for selectively transmitting torque from a torque input means to a torque output means, and for blocking transmission of torque from said output means to said input means, comprising:

a drum having a cylindrical inner surface;

a pair of shoes positioned within said drum, each of said shoes having an arcuate surface bearing against the inner surface of said drum;

a spanner bar extending between said shoes and engaging their inner surfaces at points lying on the same side of the axis of said drum said spanner bar being so positioned with respect to the drum axis that a perpendicular struck from its centerline at the intersection of the centerline with the inner drum surface forms an angle with a drum inner surface tangent struck from the same point which is in the lock angle range for the materials employed to form the drum and shoe surfaces;

said shoes being displaceable toward each other at their ends lying on the side of the drum axis opposite their points of engagement with said spanner bar;

said shoes having among them at least two force transmitting surfaces oriented generally radially of said drum;

force transmitting means engagable with each of said surfaces;

one of said force transmitting surfaces being oriented such that a force applied generally orthogonally therethrough by said force transmitting means sets both of said shoes in jamming relationship with the inner surface of said drum; and the other of said force transmitting surfaces being oriented such that a force applied generally orthogonally therethrough by said force transmitting means slidingly rotates said shoes within said drum without jamming thereagainst.

2. Apparatus in accordance with claim 1 and further comprising means biasing the ends of said shoes lying on the side of the drum axis opposite their points of engagement with said spanner bar away from each other.

3. Apparatus for selectively transmitting torque from a torque input means to a torque output means, and for blocking transmission of torque from said output means to said input means, comprising:

a drum having a cylindrical inner surface;

a pair of shoes positioned within said drum, each of said shoes having an arcuate surface bearing against the inner surface of said drum;

a spanner bar extending between said shoes and engaging their inner surfaces at points lying on the same side of the axis of said drum;

said shoes being displaceable toward each other at their ends lying on the side of the drum axis opposite their points of engagement with said spanner bar;

said shoes having among them at least two force transmitting surfaces oriented generally radially of said drum;

force transmitting means engagable with each of said surfaces;

one of said force transmitting surfaces being oriented such that a force applied generally orthogonally therethrough by said force transmitting means sets a shoe in jamming relationship with the inner surface of said drum;

the other of said force transmitting surfaces being oriented such that a force applied generally orthogonally therethrough by said force transmitting means slidingly rotates said shoes within said drum without jamming thereagainst;

at least one of said force transmitting surfaces comprising an end of a shoe.

4. Apparatus in accordance with claim 1 in which at least one of said force transmitting surfaces comprises a wall of a cavity formed on the radially inward surface of a shoe.

5. Apparatus in accordance with claim 1 in which at least one of said force transmitting surfaces comprises a wall of a cavity formed on a surface of a shoe which lies transverse to the axis of said drum.

6. Apparatus in accordance with claim 1 in which at least one of said force transmitting surfaces comprises an extension of said shoe projecting axially of said drum.

7. Apparatus for selectively transmitting torque from a torque input means to a torque output means, and for blocking transmission of torque from said output means to said input means, comprising:

a drum having a cylindrical inner surface;

a pair of shoes positioned within said drum, each of said shoes having an arcuate surface bearing against the inner surface of said drum;

a spanner bar extending between said shoes and engaging their inner surfaces at points lying on the same side of the axis of said drum;

said shoes being displaceable toward each other at their ends lying on the side of the drum axis opposite their points of engagement with said spanner bar;

said shoes having among them at least two force transmitting surfaces oriented generally radially of said drum;

force transmitting means engagable with each of said surfaces;

one of said force transmitting surfaces being oriented such that a force applied generally orthogonally therethrough by said force transmitting means sets a shoe in jamming relationship with the inner surface of said drum;

the other of said force transmitting surfaces being oriented such that a force applied generally orthogonally therethrough by said force transmitting means slidingly rotates said shoes within said drum without jamming thereagainst; and said force transmitting means comprising a shaft axially aligned with the axis of said drum and a yoke mounted for rotation with said shaft, said yoke being engagable with a least one of said force transmitting surfaces.

8. Apparatus in accordance with claim 7 in which said shaft is rotatable in both directions and said yoke is engagable with two oppositely facing force transmitting surfaces.

9. Apparatus for selectively transmitting torque from a torque input means to a torque output means, and for blocking transmission of torque from said output means to said input means, comprising:

a drum having a cylindrical inner surface;

a pair of shoes positioned within said drum, each of said shoes having an arcuate surface bearing against the inner surface of said drum;

a spanner bar extending between said shoes and engaging their inner surfaces at points lying on the same side of the axis of said drum;

said shoes being displaceable toward each other at their ends lying on the side of the drum axis opposite their points of engagement with said spanner bar;

said shoes having among them at least two force transmitting surfaces oriented generally radially of said drum;

force transmitting means engagable with each of said surfaces;

one of said force transmitting surfaces being oriented such that a force applied generally orthogonally therethrough by said force transmitting means ses a shoe in jamming relationship with the inner surface of said drum;

the other of said force transmitting surfaces being oriented such that a force applied generally orthogonally therethrough by said force transmitting means slidingly rotates said shoes within said drum without jamming thereagainst;

said force transmitting means comprising a shaft axially aligned with the axis of said drum and a disk mounted for rotation with said shaft, said disk having a pin thereon engagable with at least one of said force transmitting surfaces.

10. Apparatus for selectively transmitting torque from a torque input means to a torque output means, and for blocking transmission of torque from said output means to said input means, comprising:

a drum having a cylindrical inner surface;

a pair of shoes positioned within said drum, each of said shoes having an arcuate surface bearing against the inner surface of said drum;

a spanner bar extending between said shoes and engaging their inner surfaces at points lying on the same side of the axis of said drum;

said shoes being displaceable toward each other at their ends lying on the side of the drum axis opposite their points of engagement with said spanner bar;

said shoes having among them at least two force transmitting surfaces oriented generally radially of said drum;

force transmitting means engagable with each of said surfaces;

one of said force transmitting surfaces being oriented such that a force applied generally orthogonally therethrough by said force transmitting means sets a shoe in jamming relationship with the inner surface of said drum;

the other of said force transmitting surfaces being oriented such that a force applied generally orthogonally therethrough by said force transmitting means slidingly rotates said shoes within said drum without jamming thereagainst; and said force transmitting means comprising a shaft axially aligned with the axis of said drum and a disk mounted thereon, said disk having a slot therein engagable with at least one of said force transmitting surfaces.

11. Apparatus for selectively transmitting torque from a torque input means to a torque ouput means, and for blocking transmission of torque from said output means to said input means, comprising:

a drum having a cylindrical inner surface;

a pair of shoes positioned within said drum, each of said shoes having an arcuate surface bearing against the inner surface of said drum;

a spanner bar extending between said shoes and engaging their inner surfaces at points lying on the same side of the axis of said drum;

said shoes being displaceable toward each other at their ends lying on the side of the drum axis opposite their points of engagement with said spanner bar;

said shoes having among them at least two force transmitting surfaces oriented generally radially of said drum;

force transmitting means engagable with each of said surfaces;

one of said force transmitting surfaces being oriented such that a force applied generally orthogonally therethrough by said force transmitting means sets a shoe in jamming relationship with the inner surface of said drum;

the other of said force transmitting surfaces being oriented such that a force applied generally orthogonally therethrough by said force transmitting means slidingly rotates said shoes within said drum without jamming thereagainst; and said force transmitting means comprising a shaft axially aligned with the axis of said drum and a collar mounted for rotation with said shaft, said collar having a radially extending finger thereon engagable with at least one of said force transmitting surfaces.

12. Apparatus for selectively transmitting torque from a torque input means to a torque output means, and for blocking transmission of torque from said output means to said input means, comprising:

a drum having a cylindrical inner surface;

a pair of shoes positioned within said drum, each of said shoes having an arcuate surface bearing against the inner surface of said drum;

a spanner bar extending between said shoes and engaging their inner surfaces at points lying on the same side of the axis of said drum;

said shoes being displaceable toward each other at their ends lying on the side of the drum axis opposite their points of engagement with said spanner bar;

said shoes having among them at least two force transmitting surfaces oriented generally radially of said drum;

force transmitting means engagable with each of said surfaces;

one of said force transmitting surfaces being oriented such that a force applied generally orthogonally therethrough by said force transmitting means sets a shoe in jamming relationship with the inner surface of said drum;

the other of said force transmitting surfaces being oriented such that a force applied generally orthogonally therethrough by said force transmitting means slidingly rotates said shoes within said drum without jamming thereagainst;

said torque input means and said torque output means comprising a shaft mounted axially of said drum, and being rotatable with respect thereto;

said force transmitting surfaces comprising two surfaces on a single shoe;

and said force transmitting means comprising a single element mounted for rotation with said shaft and engagable with each of said force transmitting surfaces.

13. Apparatus in accordance with claim 12 in which said force transmitting surfaces comprise opposite sides of a axially extending hole in said single shoe and said force transmitting means comprise a pin on said single element extending into said hole.

14. Apparatus for selectively transmitting torque from a torque input means to a torque output means, and for blocking transmission of torque from said output means to said input means, comprising:

a drum having a cylindrical inner surface;

a pair of shoes positioned within said drum, each of said shoes having an arcuate surface bearing against the inner surface of said drum;

a spanner bar extending between said shoes and engaging their inner surfaces at points lying on the same side of the axis of said drum;

said shoes being displaceable toward each other at their ends lying on the side of the drum axis opposite their points of engagement with said spanner bar;

said shoes having among them at least two force transmitting surfaces oriented generally radially of said drum;

force transmitting means engagable with each of said surfaces;

one of said force transmitting surfaces being oriented such that a force applied generally orthogonally therethrough by said force transmitting means sets a shoe in jamming relationship with the inner surface of said drum;

the other of said force transmitting surfaces being oriented such that a force applied generally orthogonally therethrough by said force transmitting means slidingly rotates said shoes within said drum without jamming thereagainst;

said torque input means comprising a first shaft mounted axially of said drum and being rotatable with respect thereto;

said torque output means comprising a second shaft mounted axially of said drum and being rotatable with respect thereto;

said force transmitting surfaces comprising four surfaces, each of said shoes having a surface of the one kind and a surface of the other kind;

and said force transmitting means comprising a first force transmitter mounted for rotation with said first shaft and engagable with both surfaces of said other kind a a second force transmitter mounted for rotation with said second shaft and engagable with both surfaces of said one kind.

15. Apparatus in accordance with claim 14 in which:

said force transmitting surfaces of said other kind comprise walls of cavities formed on the radially inward surface of each shoe; and said first force transmitter comprises a yoke having two legs, one of which extends into each of said cavities.

16. Apparatus for selectively transmitting torque from a torque input means to a torque output means, and for blocking transmission of torque from said output means to said input means, comprising:

a drum having a cylindrical inner surface;

a pair of shoes positioned within said drum, each of said shoes having an arcuate surface bearing against the inner surface of said drum;

a spanner bar extending between said shoes and engaging their inner surfaces at points lying on the same side of the axis of said drum;

said shoes being displaceable toward each other at their ends lying on the side of the drum axis opposite their points of engagement with said spanner bar;

said shoes having among them at least two force transmitting surfaces oriented generally radially of said drum;

force transmitting means engagable with each of said surfaces;

one of said force transmitting surfaces being oriented such that a force applied generally orthogonally therethrough by said force transmitting means sets a shoe in jamming relationship with the inner surface of said drum;

the other of said force transmitting surfaces being oriented such that a force applied generally orthogonally therethrough by said force transmitting means slidingly rotates said shoes within said drum without jamming thereagainst;

said torque input means comprising a first shaft mounted axially of said drum and being rotatable with respect thereto;

said torque output means comprising a second shaft mounted axially of said drum and being rotatable with respect thereto;

said force transmitting surfaces comprising four surfaces, each of said shoes having a surface of the one kind and a surface of the other kind;

said force transmitting means comprising a first force transmitter mounted for rotation with said first shaft and engagable with both surfaces of said other kind and a second force transmitter mounted for rotation with said second shaft and engagable with both surfaces of said one kind;

said force transmitting surface of said one kind comprising opposed end faces of said shoes; and said second force transmitter comprising an element extending radially of said drum axis and having a part interposed between said opposed end faces.

17. Apparatus for selectively transmitting torque from a torque input means to a torque output means, and for blocking transmission of torque from said output means to said input means, comprising:

a drum having a cylindrical inner surface;

a pair of shoes positioned within said drum, each of said shoes having an arcuate surface bearing against the inner surface of said drum;

a spanner bar extending between said shoes and engaging their inner surfaces at points lying on the same side of the axis of said drum;

said shoes being displaceable toward each other at their ends lying on the side of the drum axis opposite their points of engagement with said spanner bar;

said shoes having among them at least two force transmitting surfaces oriented generally radially of said drum;

force transmitting means engagable with each of said surfaces;

one of said force transmitting surfaces being oriented such that a force applied generally orthogonally therethrough by said force transmitting means sets a shoe in jamming relationship with the inner surface of said drum;

the other of said force transmitting surfaces being oriented such that a force applied generally orthogonally therethrough by said force transmitting means slidingly rotates said shoes within said drum without jamming thereagainst;

said torque input means comprising a first shaft rotatably mounted axially of said drum and adapted to rotate said drum therewith;

said torque output means comprising a second shaft rotatably mounted axially of said drum;

and said force transmitting means comprising a first force transmitter mounted for rotation axially of said drum and engagable with said other surface of said shoes and a second force transmitter mounted for rotation with said second shaft and engagable with said one surface of said shoes;

and said apparatus further comprising means for selectively admitting and restraining rotation of said first force transmitting means in the same direction as the direction of rotation of said drum.

18. Apparatus in accordance with claim 17 in which:

said first shaft is adapted for rotation in both directions;

said force transmitting surfaces comprise four surfaces, each of said shoes having a surface of the one kind and a surface of the other kind;

said first force transmitter is engagable with both of the surfaces of the other kind;

said second force transmitter is engagable with both of the surfaces of the one kind; and said means for selectively admitting and restraining rotation of said first force transmitting means include means for selectively admitting and restraining rotation in both directions.

19. A winch comprising:

a rotatable cable drum having end flanges;

a power input shaft passing axially through said cable drum;

a generally cylindrical drum fixedly mounted against rotation at one end of said cable drum and aligned axially therewith;

a pair of arcuate shoes positioned for sliding rotation within said fixed drum, the ends of said shoes being spaced apart;

a spanner bar extending between said shoes and engaging them at points to one side of the axis of said fixed drum;

a yoke mounted for rotation with said input shaft and engagable with said shoes at points on the other side of the axis of said fixed drum from said spanner bar;

and a pin mounted on an end flange of said cable drum and extending between said shoe ends on the other side of said fixed drum axis from said spanner bar in position to transmit forces to and from the ends of said shoes.

20. A stepping clutch comprising:

an input shaft;

a generally cylindrically drum mounted for rotation with said input shaft;

an output shaft axially aligned with said input shaft;

a collar mounted for rotation on said output shaft within said drum, said collar having a radially extending finger;

a pair of arcuate shoes positioned in said drum on opposite sides of said collar finger;

a spanner bar extending between said shoes and engaging them at points on the opposite side of the drum axis from said finger;

a disk mounted for rotation on said output shaft having means thereon engagable with a shoe;

and means for selectively restraining rotation of said disk in at least one direction.

21. A stepping clutch in accordance with claim 20 in which said restraining means are constructed and arranged to selectively restrain rotation in either direction.

22. A load holder comprising:

a rotatable shaft;

a generally cylindrical drum fixedly mounted axially of said shaft;

a shaft of arcuate shoes positioned for sliding rotation within said fixed drum;

a spanner bar extending between said shoes and engaging them at points on the same side of said drum axis;

a disk mounted for rotation on said shaft;

a transverse hole in one of said shoes;

and a pin on said disk extending into said hole.

23. A two-way load holder comprising:

a rotatable output shaft;

a power input shaft axially aligned with said output shaft;

a generally cylindrical drum fixedly mounted against rotation aligned axially with said output shaft;

a pair of arcuate shoes positioned for sliding rotation within said fixed drum, the ends of said shoes being spaced apart;

a spanner bar extending between said shoes and engaging them at points to one side of the axis of said fixed drum;

a yoke mounted for rotation with said input shaft and engagable with said shoes at points on the other side of the axis of said fixed drum from said spinner bar;

a disk mounted on said output shaft for rotation therewith;

a pin mounted on said disk and extending between said shoe ends on the other side of said fixed drum axis from said spanner bar in position to transmit forces to and from the ends of said shoes.

24. Apparatus for selectively transmitting torque from a torque input means to a torque output means, and for blocking transmission of torque from said output means comprising:

a drum having a cylindrical inner surface;

a spanner bar;

surfaces adjacent opposite ends of said spanner bar bearing against the inner surface of said drum adjacent at pairs of opposed points on said inner surface each of said pairs of opposed points being located so that a first line joining them is parallel to but offset from a diameter of said drum and so that a second line struck perpendicular to said first line at either of said points forms a jamming angle with a drum inner surface tangent struck from either of said points;

first force transmitting means to apply a first force to said spanner bar such that said first force results in application of force through said spanner bar to urge both ends of said spanner bar substantially radially of said cylindrical inner surface to frictionally engage said opposed portions of the cylindrical inner surface; and second force transmitting means to apply a second force to said spanner bar to move said spanner bar relative to the central axis of the cylindrical inner surface to prevent simultaneous engagement of opposite ends of said spanner bar with the cylindrical inner surface.

25. Apparatus in accordance with claim 24 wherein said jamming angle is approximately 7°.

26. Apparatus in accordance with claim 24 in which said second force transmitting means is adapted to move said surfaces into jamming relationship with the cylindrical inner surface of said drum.

27. Apparatus in accordance with claim 24 wherein said first force transmitting means is adapted to move said spanner bar in a direction tending to remove said surfaces from jamming relationship with the cylindrical surfaces of said drum.

28. Apparatus for selectively transmitting torque from a torque input means to a torque output means, and for blocking transmission of torque from said output means to said input means comprising:

a drum having a generally cylindrical inner surface and a central axis;

a spanner bar having a length which is slightly less than the distance between pairs of opposed points on said generally cylindrical inner surface each of said pairs of opposed points being located so that a first line joining them is parallel to but offset from a diameter of said drum, said spanner bar having surfaces adjacent opposite ends thereof engagable with said pairs of opposed points on said inner surface, a diametrically extending second line through one of said contact points and the drum axis and said first line intersecting at an angle which is sufficiently small to permit rotation of said spanner bar relative to said cylindrical inner surface when a force is applied in a first direction to the spanner bar tending to rotate the spanner bar in a direction to move said opposite ends of said spanner bar out of jamming relationship with said inner cylindrical surface and to jam said opposite ends of said spanner bar into engagement with said inner surface to prevent rotation of said spanner bar relative to said inner cylindrical surface when force is applied in a second direction to said spanner bar tending to rotate said bar in a direction opposite to said first direction;

and force transmitting means adapted to apply force in said first or second direction to said spanner bar.

29. Apparatus in accordance with claim 28 said force transmitting means comprising:

a pin; and means supporting said pin for rotation about the axis of said cylindrical inner surface such that movement of the pin relative to said spanner bar results in application of force to said spanner bar.

30. Apparatus in accordance with claim 28, with the addition of means to prevent movement of the line extending through each of said contact points when a force is applied tending to move said line past the central axis.

31. Apparatus in accordance with claim 28, said force transmitting means being adapted to apply a first force in a direction to urge a central portion of the spanner bar toward the central axis or a second force in a direction to urge a central portion of the spanner bar away from the central axis.

* * * * *